US006347305B1

(12) United States Patent
Watkins

(10) Patent No.: US 6,347,305 B1
(45) Date of Patent: Feb. 12, 2002

(54) METHOD FOR SELECTING AND PROCESSING A PAYROLL DEDUCTION PLAN AS A PAYMENT OPTION DURING ELECTRONIC COMMERCE

(75) Inventor: Kirk Watkins, Warrington, PA (US)

(73) Assignee: E-Duction, Inc., Blue Bell, PA (US)

( * ) Notice: Subject to any disclaimer, the term of this patent is extended or adjusted under 35 U.S.C. 154(b) by 0 days.

(21) Appl. No.: 09/429,616

(22) Filed: Oct. 29, 1999

(51) Int. Cl.$^7$ ............................................... G06F 17/60
(52) U.S. Cl. ........................................... 705/26; 705/27
(58) Field of Search ..................................... 705/26, 27

(56) References Cited

U.S. PATENT DOCUMENTS

| | | | | |
|---|---|---|---|---|
| 5,283,829 A | | 2/1994 | Anderson | 380/24 |
| 5,717,867 A | * | 2/1998 | Wynn et al. | 705/32 |
| 5,758,327 A | | 5/1998 | Gardner et al. | 705/26 |
| 5,895,454 A | | 4/1999 | Harrington | 705/26 |
| 5,899,980 A | * | 5/1999 | Wilf et al. | 705/26 |
| 5,920,847 A | | 7/1999 | Kolling et al. | 705/40 |
| 5,943,424 A | | 8/1999 | Berger et al. | 380/25 |

FOREIGN PATENT DOCUMENTS

JP        08249530    *  9/1996

OTHER PUBLICATIONS

Nelson, Richard R., Monthly Labor Review , State Labor Legislation Enacted in 1993, Jan. 1994, vol. 117, No. 1, p36(17).*
"Portable Self Checkout Retail System", IBM Technical Disclosure Bulletin, Jun. 1992, vol. 35, No. 1A, pp. 315–318.*
"Shoes For Crews: Payroll Deduction Plan—How it Works," www.shoesforcrews.com.
Payroll Deduction Request, Powerco Credit Union, www.powercocu.org.
Kirtley–Cole Company Store Online Apparel and Gift Ordering Form, www.kirtley–cole.com.

* cited by examiner

*Primary Examiner*—Vincent Millin
*Assistant Examiner*—Charles Kyle
(74) *Attorney, Agent, or Firm*—Morgan, Lewis & Bockius LLP

(57) ABSTRACT

A method for selecting and processing payroll deduction as a payment option for articles purchased during electronic commerce. An employer authorizes selected vendors involved in electronic commerce to accept payroll deduction as a payment option for the employer's employees. The employer and vendor establish guidelines for utilizing the payroll deduction option during electronic commerce and the vendor stores the guidelines and identifying information for the employer and corresponding employees in a database in the vendor's computer. Thereafter, when an employee selects articles from the vendor's web site, the employee may select payroll deduction as the payment option. The vendor places the employee's selections and payment option in a file and forwards them to the employer. The employer may approve or reject the employee's selection and the vendor processes the order according to the employer's instructions. Then the vendor informs the employee about the status of the order. This method therefore affords authorized employees the option of using payroll deduction during electronic commerce.

57 Claims, 5 Drawing Sheets

| APPLICATION LAYER/LAYER 5 |
| 202 |

| TRANSPORT LAYER/LAYER 4 |
| 204 |

| INTERNET LAYER/LAYER 3 |
| 206 |

| NETWORK INTERFACE LAYER/ LAYER 2 |
| 208 |

| PHYSICAL LAYER/LAYER 1 |
| 210 |

TCP/IP LAYERING MODEL

*FIG. 2*

METHOD FOR SELECTING AND PROCESSING A PAYROLL DEDUCTION PLAN AS A PAYMENT OPTION DURING ELECTRONIC COMMERCE

FIELD OF THE INVENTION

The present invention relates to a method for processing payments of articles selected during electronic commerce, and more particularly, to a method for selecting and processing a payroll deduction plan as a way of paying for articles selected on an Internet vendor's web site.

BACKGROUND OF THE INVENTION

Advances in computer processing power and network communications have made information from a wide variety of sources available to users on computer networks. Computer networking allows network computer users to share information, software applications and hardware devices, and internetworking enables a set of physical networks to be connected into a single network such as the Internet. Computers connected to the Internet or connected to networks other than the Internet also have access to information stored on those networks. The World Wide Web (Web), a hypermedia system used on the Internet, enables hypertext linking, whereby documents automatically reference or link other documents located on connected computer networks around the world. Thus, users connected to the Internet have almost instant access to information stored in relatively distant regions.

A page of information on the Web may include references to other Web pages and may include a broad range of multimedia data including textual, graphical, audio, and animation information. Currently, Internet users retrieve information from the Internet, through the Web, by 'visiting' a web site on a computer that is connected to the Internet.

The web site is, in general terms, a server application that displays information stored on a network server computer. The web site accepts connections from client programs, such as Internet browser applications. Browser applications, such as Microsoft Explorer™ or Netscape Internet Browser™, allow Internet users to access information displayed on the web site. Most browser applications display information on computer screens and permit a user to navigate through the Web using a mouse. Like other network applications, Web browsing uses a client-server paradigm. When given a Uniform Resource Locator (URL) of a document, the browser application becomes a client and it contacts a server application specified in the URL to request the document. After receiving the document from the server application, the browser application displays the document to the user. When the browser application interacts with the server application, the two applications follow the HyperText Transport Protocol (HTTP). HTTP allows the browser application to request a specific article, which the server application then returns. To ensure that browser applications and server applications inter-operate unambiguously, HTTP defines the exact format for requests sent from the browser application to the server application as well as the format of replies that the server application returns.

As the number of physical networks connected to the Internet continues to grow, so too will the number of web sites that are accessible to Internet users and so too will commercial activity on the Internet. Providers of a wide range of products and/or services are continuously exploring new methods for promoting and selling them. Commercial vendors' web sites are similar to other types of web sites except that they usually incorporate functionality to enable financial transactions between users and vendors.

Currently, during an electronic commerce transaction on the Internet, a consumer enters the URL of a vendor and the browser application requests a web page associated with the URL from the appropriate server application. The consumer may select articles displayed on the vendor's web page and submit the selection to the vendor through the browser application. For example, a consumer on the Internet, wishing to purchase a software application, may enter the URL of a vendor into the browser application. The browser displays a corresponding web page and the consumer may order the software application on the web page through the browser application. Upon receiving the consumer's selection, the vendor requests payment for the selected articles before delivering them to the consumer. The consumer may pay the vendor through credit cards or the vendor may require cash upon delivery of the selected articles. However, for consumers who do not have credit cards, do not wish to use credit cards, or do not have cash available at the time of delivery of the selected articles, this method of purchasing articles during electronic commerce is unsatisfactory.

Some employers currently offer, as a benefit to their employees, payroll deduction plans as a method of paying for predetermined products and/or services with predetermined vendors. Under the payroll deduction plan, the employer may deduct the cost of already purchased articles and/or services from an employee's future pay checks. Before the employee can use the payroll deduction plan as a payment option, the employer must approve the total purchase amount and the vendor. While this scheme affords employees the option of purchasing products and services on future earnings, the list of predefined products/services and vendors is usually limited. Moreover, the payroll deduction payment option is not utilized in electronic commerce. As electronic commerce on the Internet grows, so too will the desire to use the payroll deduction plan as an option for on-line purchases.

SUMMARY OF THE INVENTION

The present invention relates to a method for selecting and processing a payroll deduction as a payment option for articles purchased during electronic commerce. An employer authorizes selected vendors involved in electronic commerce to accept the payroll deduction as a payment option for the employer's employees. The employer and vendor establish guidelines for utilizing the payroll deduction option during electronic commerce and the vendor stores the guidelines and identifying information for the employer and corresponding employees in a database in the vendor's computer. Alternatively, the employer may periodically provide a list with information about employees who qualify to participate in the payroll deduction plan and the vendor updates the database with the periodic list. Thereafter, when an employee selects articles from the vendor's web site, the employee may select payroll deduction as the payment option. The vendor then places the employee's total purchase and payment option in a file and forwards them to the employer. The employer may review the employee's total purchase and instruct the vendor on how to process it. The vendor processes the selections according to the employer's instructions and informs the employee about the status of the order. This method therefore affords authorized employees the option of using payroll deduction during electronic commerce.

Specifically in the preferred embodiment of the present invention, when an employee 'enters' the selected vendor's web site and chooses articles to be purchased, the employee may select payroll deduction as the payment method. The employee is then asked to enter his/her e-mail address and to create a secret password. Thereafter, the employee may enter the respective on-line account with the e-mail address and password. The employee is also asked to enter a unique employer identifier. To ensure accurate employer information during each electronic commerce transaction, employees who previously utilized payroll deductions to pay for on-line purchases may be asked to update or confirm their employer information. The employee is then transferred to a confirmation page to confirm the types and quantities of selected articles, the employer's information and the payroll deduction information. Upon confirming the information, the employee is requested to sign a financial responsibility agreement. Thereafter, the employee submits an electronic order for the selected articles to the vendor; the electronic order is processed by the vendor's computer system and an order summary of the electronic order is placed in the appropriate employer's holding file. A confirmation e-mail is also sent from the vendor to the employee. Each employer that participates in the vendor's payroll deduction plan has a unique holding file where the employer is able to view an order summary for each employee.

The employer is contacted to approve or reject the employee's order. If the payroll deduction transaction is approved, the order is released and processed by the vendor and an e-mail about the status of the order is sent to the consumer. Thereafter, the purchased article is sent to the employee and the appropriate amount is deducted from the employee's future earnings. If the order is rejected, the employer may note a reason for the rejection or invite the employee to contact the employer for a reason. Moreover, the employer may either instruct the vendor to hold the order in the holding file or cancel the order from the holding file. Either way, the vendor sends an email about the status of the order to the employee.

If the employer does not respond to orders in the holding file within a predetermined time, a reminder notice is sent to the employer and employee. Another predetermined time is established and if the employer does not respond to the reminder notice within that specified period of time, the vendor cancels the order. An email notifying the employee about the cancellation is sent by the vendor.

It is therefore the object of the present invention to provide a method for authorizing selected vendors to offer payroll deduction as a payment option to appropriate consumers during electronic commerce transactions and for establishing guidelines for the payroll deduction plan.

It is another object of the invention to provide a method for allowing the consumer to select payroll deduction as a payment option during on-line shopping and for confirming the selection before it is submitted to a corresponding employer.

It is yet another object of the invention to provide a method for submitting the consumer's selections to the corresponding employer, for contacting the corresponding employer to review the selection and to instruct on how it should be processed, and for processing the consumer's selections based on the employer's instructions.

Additional features and advantages of the invention will be set forth in the description that follows, and in part will be apparent from the description, or may be learned by practice of the invention. The objectives and advantages of the invention will be realized and attained by the system particularly pointed out in the written description and claims hereof as well as the appended drawings.

To achieve these and other advantages and in accordance with the purpose of the invention, as embodied and broadly described, the present invention provides a method for selecting and processing payroll deduction as a payment option during electronic commerce between a pre-selected vendor and an employee of an employer, by authorizing, by the employer, the pre-selected vendor to offer payroll deduction as a payment option during electronic commerce between the pre-selected vendor and the employee; establishing, by the pre-selected vendor and the employer, guidelines for a payroll deduction plan; selecting, by the employee, articles to be purchased from the pre-selected vendor's web site, confirming on a confirmation page the selected articles, the employer's information, the employee's information and the payroll deduction information and signing a financial responsibility agreement; submitting, by the employee to the pre-selected vendor, an electronic order with the selected articles; storing, by the pre-selected vendor, the electronic order in a holding file and contacting the employer to review an order summary of the electronic order; instructing the pre-selected vendor, by the employer, how to process the electronic order; and processing, by the pre-selected vendor, the electronic order based on the employer's instructions.

An alternate embodiment of the present invention provides a system for selecting and processing payroll deduction as a payment option during electronic commerce between a pre-selected vendor and an employee of an employer, having means for authorizing, by the employer, the pre-selected vendor to offer payroll deduction as a payment option during electronic commerce between the pre-selected vendor and the employee; means for establishing, by the pre-selected vendor and the employer, guidelines for a payroll deduction plan; means for selecting, by the employee, articles to be purchased from the pre-selected vendor's web site, means for confirming on a confirmation page the selected articles, the employer's information, the employee's information and the payroll deduction information and means for signing a financial responsibility agreement; means for submitting, by the employee to the pre-selected vendor, an electronic order with the selected articles; means for storing, by the pre-selected vendor, the electronic order in a holding file and means for contacting the employer to review an order summary of the electronic order; means for instructing the pre-selected vendor, by the employer, how to process the electronic order; and means for processing, by the pre-selected vendor, the electronic order based on the employer's instructions.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 2 illustrates the TCP/IP Layering Model Protocol used during communications between components on the computer network;

DESCRIPTION OF THE PREFERRED EMBODIMENTS

Reference will now be made in detail to the preferred embodiments of the present invention, examples of which are illustrated in the accompanying drawings. The present invention described below describes the functionality of the inventive method for processing payroll deduction for on-line purchases over the Internet.

Figure 1:
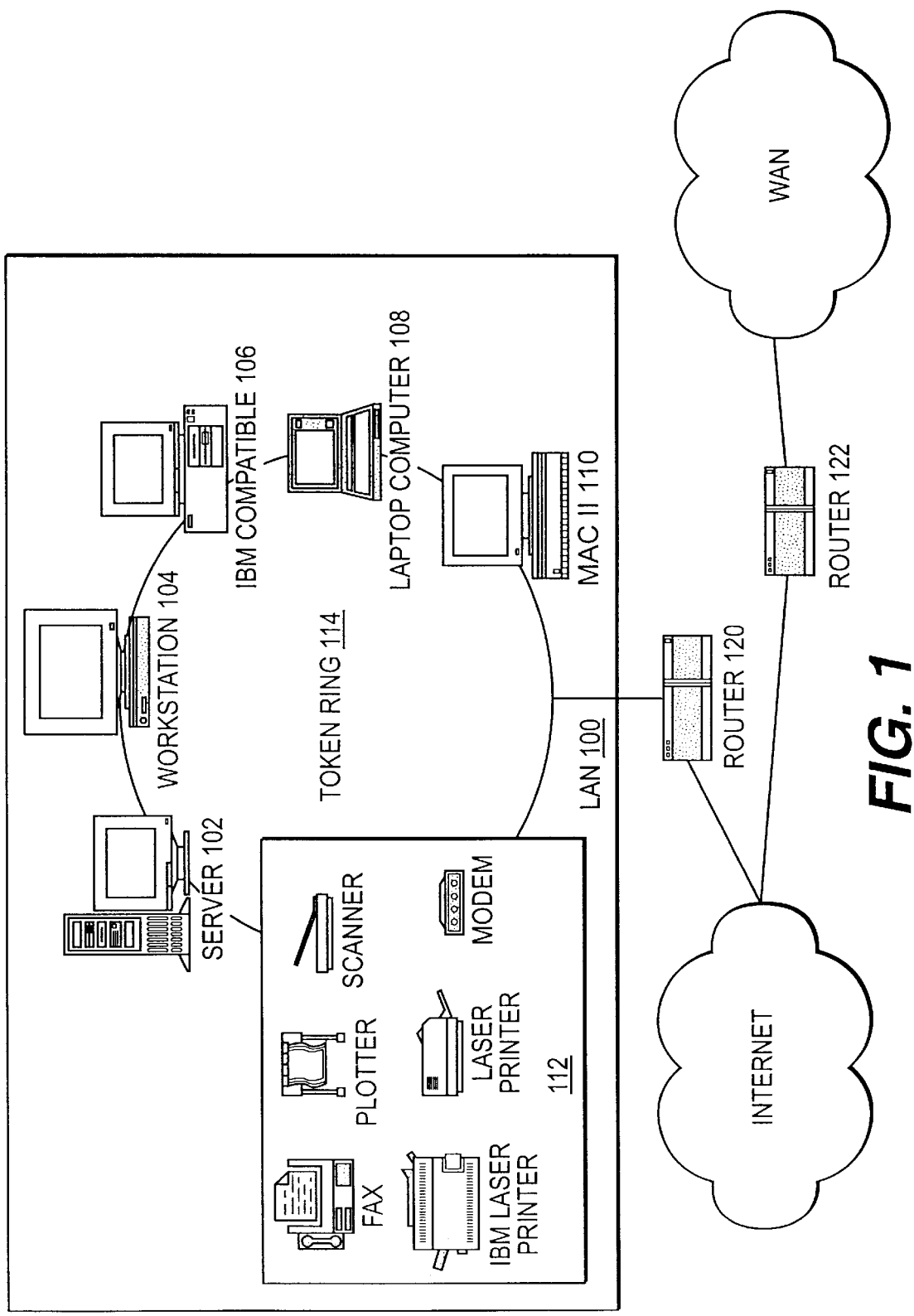
FIG. 1 illustrates a computer network in which the inventive payroll deduction plan may be incorporated.

FIG. 1 is an example of a local area network (LAN) 100 that is configured to utilize a non-repudiation protocol. LAN 100 comprises a server 102, four computer systems 104, 106, 108, and 110, and peripherals 112, such as printers and other devices that may be shared by components on LAN 100. Computer systems 104, 106, 108 and 110 may serve as clients for server 102 and/or as clients and/or servers for each other and/or for other components connected to LAN 100. Components on LAN 100 are preferably connected together by cable media, for example copper or fiber-optic cable and the network topology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and the routers that connect them must adhere to a standard protocol. Computer networks connected to the Internet and to other networks typically use TCP/IP Layering Model Protocol. It should be noted that other internetworking protocols may be used.

As illustrated in FIG. 2, the TCP/IP Layering Model comprises an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

Figure 3:
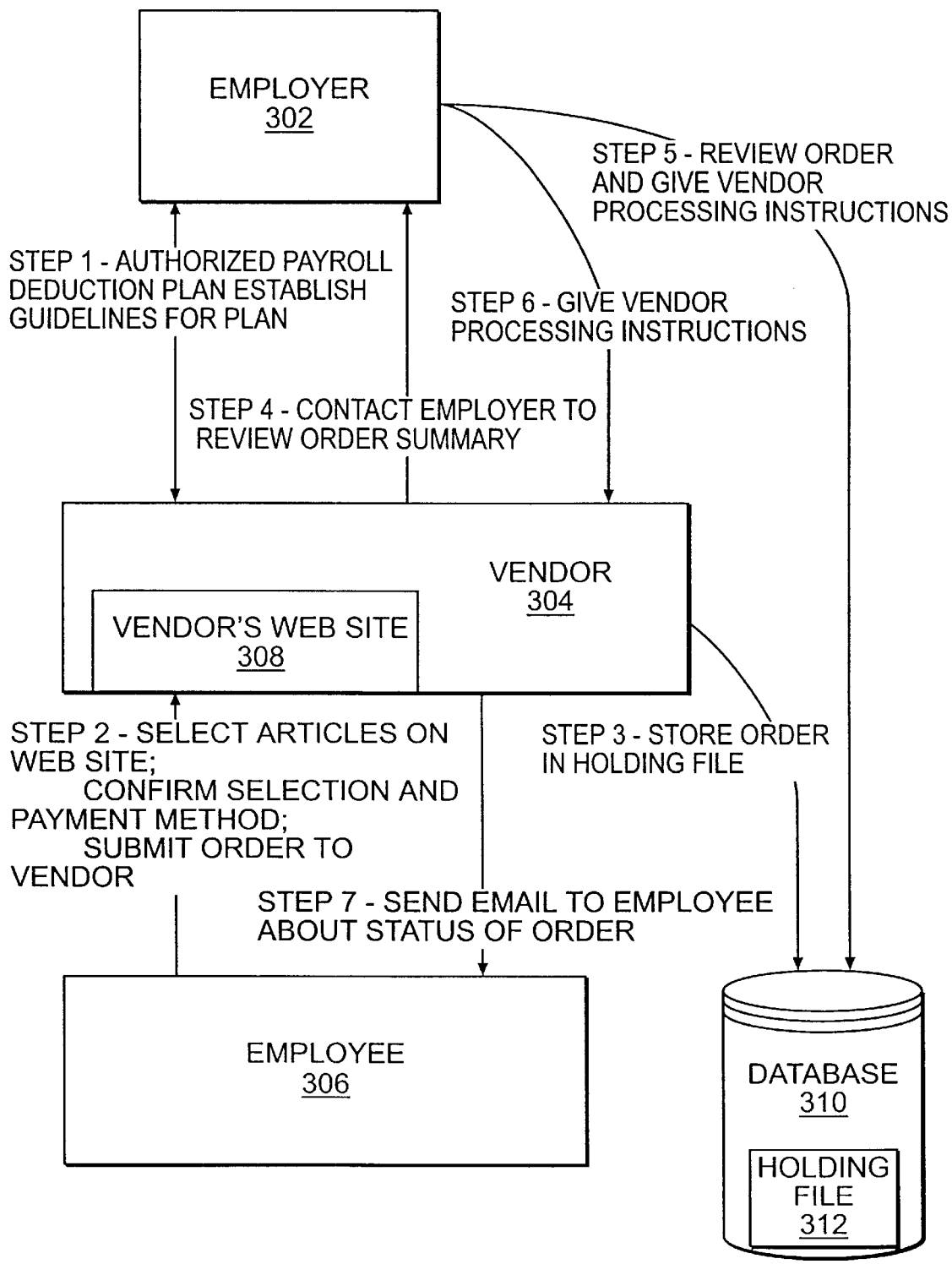
FIG. 3 illustrates a method for selecting and processing payroll deduction as a payment option for on-line purchases during electronic commerce.

FIG. 3 illustrates an inventive method for selecting and processing payroll deduction as a payment option for on-line purchases in electronic commerce on LAN 100. According to the invention, an employer 302 authorizes selected vendors, an example of which is provided as vendor 304 to accept payroll deduction as a unique form of payment during an electronic commerce transaction with the employer's employees, an example of which is shown as employee 306. During the initial authorization, employer 302 and vendor 304 establish guidelines for a payroll deduction plan. For example, employer 302 and vendor 304 may establish the number of pay periods during which deductions can occur and the number of transactions allowed to each employee 306. They may also base the number of payroll deductions on the total purchase price. For example, a purchase price that is less than forty-nine dollars and ninety nine cents is deducted from one future paycheck; a purchase price that is greater than fifty dollars and less ninety-nine dollars and ninety nine cents is deducted from two future paychecks and so on. Employer 302 and vendor 304 may establish several sets of guidelines, whereby each set is associated with employees 306 within a specific status. For example, one set of guidelines may apply to hourly employees and another set may apply to salaried employees. Employees 306 may view all guidelines or only those that apply to them and guidelines associated with each employee 302 may change as the employee's status changes. The payroll deduction plan guidelines and other information that identify employer 302 and corresponding employees 306 are stored on a database 310 in the vendor's computer. Alternatively, employer 302 may periodically provide a list with information about employees who qualify to participate in the payroll deduction plan and the vendor 304 updates the database with the periodic list.

Thereafter, employees 306 may use payroll deduction as a form of payment for articles purchased on-line. When an employee 306 'enters' the pre-selected vendor's web site 308 and chooses articles to be purchased, employee 306 may select payroll deduction as the payment method. Employee 306 is then asked to enter a personal identifier, such as a social security number or a current e-mail address, and to create a secret password. The personal identifier and password is used to confirm the consumer's identity during future purchases. As another alternative, vendor's web site 308 may be connected to other payroll processing companies and/or credit bureaus where employees' personal identifiers and employment status may be confirmed.

Employee 306 is also asked to enter a unique employer identifier. The employer identifier may be printed on the employee's physical pay stub or otherwise obtained from the employer 302 or otherwise obtained from vendor's web site 308. An employee 306 who previously utilized payroll deductions as a method of paying for on-line purchases may be asked to update the employer information, such as the employer's name, address, and telephone number. This ensures that employer information for each employee 306 is accurate during each electronic commerce transaction. For example, when employee 306 changes jobs, employee 306 will be given an opportunity to update his/her employer information to ensure that the current and subsequent payroll deduction requests are accurately processed and to access whether the new employer is also participating in the vendor's 304 payroll deduction plan. Employee 306 is then allowed to select articles to be purchased with from vendor's web site 308 or from web sites of other online merchants associated with vendor 304.

Employee 306 is then transferred to a confirmation page to confirm the types and quantities of selected articles, the employer's information and the payroll deduction information. Upon confirming the information, employee 306 is requested to sign a financial responsibility agreement. Thereafter, employee 306 submits an electronic order for the selected articles to vendor 304 and the electronic order is processed by the vendor's computer system and placed in a holding file 312 in database 310. Each employer 302 that participates in the payroll deduction plan may have a unique holding file 312.

Each employer 302 with unique holding file 312 contacted a predefined number of times within a predetermined time period when orders are pending in the employer's holding file 312 to be reviewed. For example, employer 302 may be contacted one time within a twenty-four hour period when orders are pending in the employer's holding file 312. In one embodiment of the invention, employer 302 is contacted through an e-mail with a link to a secure page. The e-mail is transmitted from the vendor's web site 308 to the employer's computer system and employer 302 may click on the link in the e-mail to connect to the secure page. Employer 302 must enter a login name and password to access information on the secure page. Thereafter, employer 302 is able to view an order summary for each employee 306. The order summary includes the date, name, address, personal identifier, total purchase price and the number of payroll deductions required to pay for the selected articles. Employer 302 may either approve or reject the payroll deduction transaction. If the payroll deduction transaction is approved, the order is released from holding file 312 and processed by vendor 304 and an e-mail about the status of the order is sent to consumer 302. Thereafter, the purchased article is sent to employee 306 by vendor 304 and the appropriate amount is deducted from the consumer's future earnings.

If the order is rejected, employer 302 may note a reason for the rejection or invite employee 306 to contact employer 302 for a reason. Employer 302 may either instruct vendor 304 to hold the order in holding file 312 or cancel the order from holding file 312. An e-mail about the status of the order is sent to consumer 306.

If employer 302 does not respond to orders in the holding file 312 within the predetermined time, a reminder notice is sent to employer 302 and employee 306 within a second predetermined time. If employer 302 does not respond to the reminder notice within a specified period of time, vendor 304 cancels the order. An e-mail notifying employee 306 about the cancellation is sent by the vendor 304.

In an alternative embodiment of the present invention, each employer 302 with unique holding file 312 contacted through a non-electronic mail, such as fax or postal mail. The non-electronic mail includes the date, name, address, and personal identifier of employee 306, the total purchase price and the number of payroll deductions required to pay for the selected articles. Employer 302 may then approve or reject the payroll deduction transaction by sending non-electronic mail to the vendor. If the order is approved, the order is released from holding file 312 and processed by vendor 304 and an e-mail about the status of the order is sent to employee 306 from the vendor 304. If the order is not approved, it is either held in holding file 312 or canceled by vendor 304 per the employer's request. An e-mail about the status of the order is sent to employee 306 who may contact vendor 304 about held orders.

In yet another alternative, vendor 304 may use previously established guidelines to serve as employer's agent. Vendor 304 may use to other payroll processing companies and/or credit bureaus to approve employee's 306 on-line payroll deduction purchases without interaction from employer 302.

Figure 4:
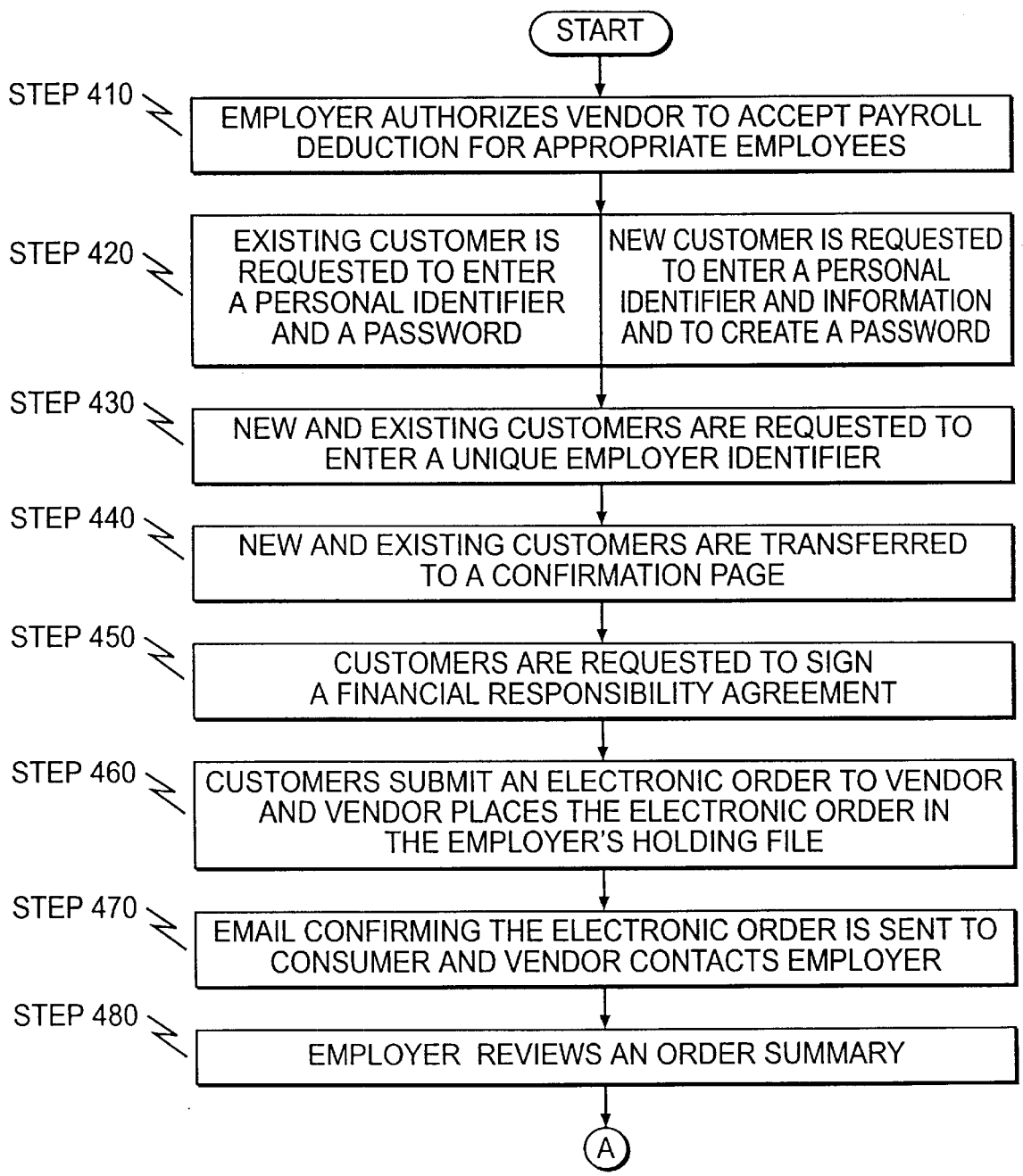
FIGS. 4 and 4A illustrate the steps implemented according to the preferred embodiment of the inventive method of FIG. 3.

FIG. 4 illustrates the steps implemented in a preferred embodiment of the inventive payroll deduction method. In Step 410, employer 302 authorizes selected vendors 304 to set up their web sites 308 to accept payroll deduction as a unique form of payment from employees 306 during electronic commerce transactions. Employees 306 may thereafter use the payroll deduction plan as a form of payment for articles selected during on-line shopping. In Step 420 an existing employee 306 who previously used the payroll deduction plan is asked to enter a personal identifier, such as an e-mail address, and an already created password. A new employee 306 who has never used the payroll deduction plan is asked to enter a personal identifier and to create a secret password. New employee 306 is also asked for personal information such as the new employee's name, address, phone number and e-mail address. An existing employee 306 may go to an update page to update his/her employer's information, such as the employer's name, address, and telephone number. In Step 430, new and existing employees 306 are then asked to enter a unique employer identifier. In Step 440, new and existing employees 306 are then transferred to a confirmation page to confirm the types and quantities of selected articles, the employer's information and the method of payment. In Step 450, upon confirming the necessary information, employee 306 is requested to sign the financial responsibility agreement with the total amount for the selected articles and the amount and number of payroll deductions required to pay for the selected articles. In Step 460, employee 306 submits an electronic order for the selected articles to vendor 304 and the electronic order is processed by the vendor's computer system and placed in holding file 312.

Figure 4A:
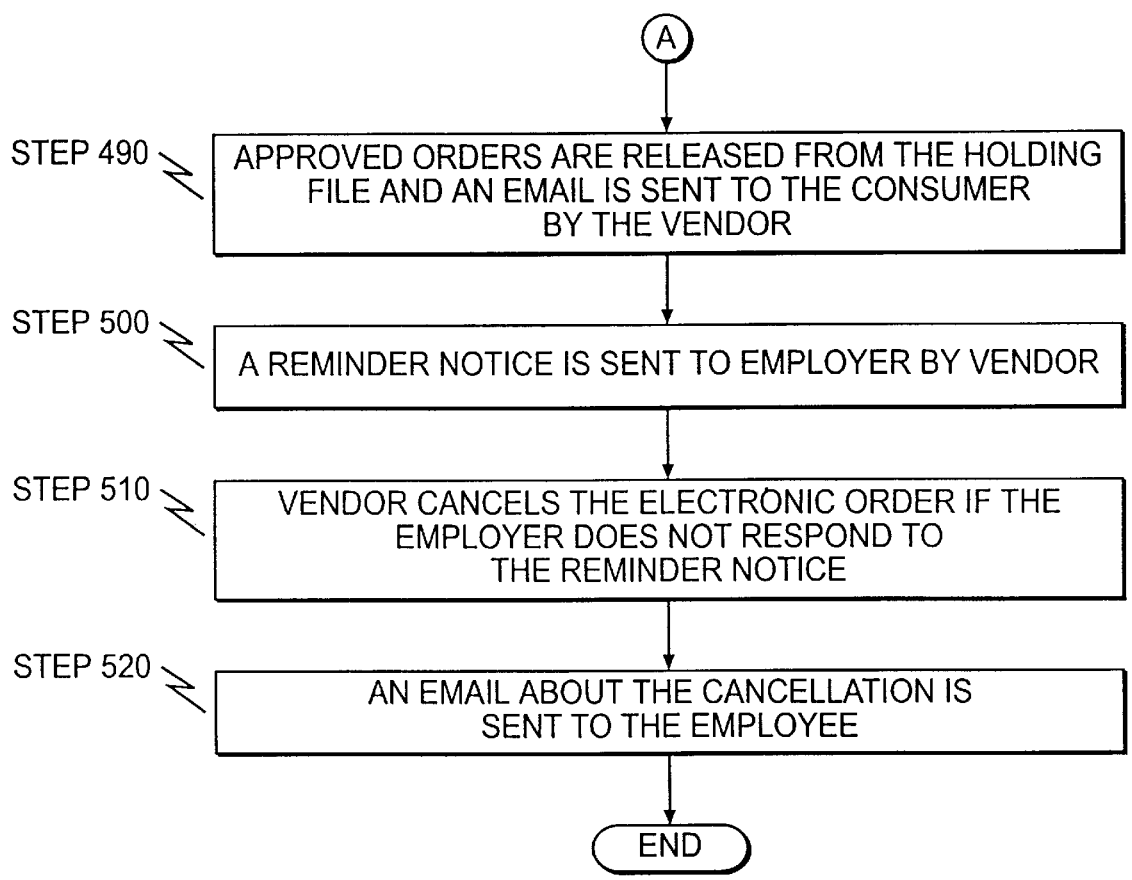

In Step 470, an e-mail confirming the order and the payroll deduction is sent to employee 306 and vendor 304 contacts employer 302 by email or non-electronic mail. In Step 480, employer 302 reviews the order summary and approves or rejects the order. In Step 490, shown in FIG. 4A, approved orders are released from holding file 312 by vendor 304 and an e-mail is sent to employee 306 about the status of the order.

In Step 500, if employer 302 does not respond to orders in holding file 312 within the predetermined time, a reminder notice is sent to employer 302 and employee 306 within a second predetermined time. In Step 510, if employer 302 does not respond to the reminder notice, vendor 304 cancels the order within a specified time period. In Step 520, an e-mail notifying employee 306 about the cancellation is subsequently sent by vendor 304.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true'spirit and scope of the invention.

What is claimed:

1. A method for selecting and processing payroll deduction as a payment option during electronic commerce between pre-selected vendors and an employee of an employer, the method comprising the steps of:

authorizing, by the employer, the pre-selected vendors to offer payroll deduction as a payment option during electronic commerce between the pre-selected vendors and the employee;

establishing, by the pre-selected vendors and the employer, guidelines for a payroll deduction plan;

storing the guidelines in the pre-selected vendors respective databases or in an external processing system database;

selecting, by the employee, articles to be purchased from a web site of at least one pre-selected vendor, confirming on a confirmation page the selected articles, employer information, employee information and payroll deduction information and accepting a financial responsibility agreement;

submitting, by the employee to the at least one pre-selected vendor or to the external processing system, at least one electronic order with the selected articles;

storing, by the at least one pre-selected vendor or the external processing system, the at least one electronic order in a holding file and contacting the employer to review an order summary of the at least one electronic order;

instructing the at least one pre-selected vendor, by the employer through the external processing system, to process the electronic order; and dynamically processing, by the at least one pre-selected vendor or the external processing system, the at least one electronic order based on guidelines.

2. The method of claim 1, wherein the step of establishing guidelines further comprises the steps of:

establishing a number of pay periods during which payroll deductions can occur, establishing a number of transactions allowed to each employee; and basing the number of payroll deductions on a total price of the electronic order.

3. The method of claim 2, wherein the step of selecting articles to be purchased further comprises the step of choosing payroll deduction as a payment option.

4. The method of claim 3, further comprising the step of requesting the employee to enter a personal identifier, a secret password and an employer identifier upon the step of choosing payroll deduction as a payment option.

5. The method of claim 4, further comprising the step of using the secret password to confirm employee identity information for future electronic purchases.

6. The method of claim 5, further comprising the step of obtaining the employer identifier by the employee from the employer or from the pre-selected vendor's web site.

7. The method of claim 6, further comprising the step of ensuring accurate employer information by requesting the employee, who previously used payroll deduction as a payment option during a previous electronic commerce transaction on the pre-selected vendor's web site, to update the employer's information during a current electronic commerce transaction.

8. The method of claim 7, further comprising the step of creating a unique holding file for each employer that authorizes payroll deduction as a payment option on the pre-selected vendor's web site.

9. The method of claim 8, wherein the step of contacting the employer to review the order summary further comprises the step of contacting the employer, a predefined number of times within a predetermined time period, when the order summary is pending in the employer's holding file.

10. The method of claim 9, wherein the step of contacting the employer when the order summary is pending farther comprises the step of transmitting the order summary in an email with a link to a secure page from the pre-selected vendor's web site to a computer system of employer.

11. The method of claim 9, wherein the step of contacting the employer when the order summary is pending further comprises the step of transmitting the order summary in non-electronic mail from the pre-selected vendor's web site to the employer.

12. The method of claim 10 or 11, further comprising the step of storing in the order summary a date, a name and address of the employee, the employee's personal identifier, a total purchase price, and a number of required payroll deductions.

13. The method of claim 12, wherein the step of reviewing further comprises the step of approving or rejecting the order summary.

14. The method of claim 13, wherein the step of processing the electronic order further comprises the steps of:

processing a transaction if the order summary is approved;

releasing the order summary from the holding file;

contacting the employee to give a status about the transaction; and delivering the selected articles to the employee.

15. The method of claim 14, further comprising the step of deducting, by the employer an appropriate amount from future earnings of the employee.

16. The method of claim 13, wherein the step of reviewing further comprises the step of noting a reason for rejecting the order summary or inviting the employee to contact the employer for the reason.

17. The method of claim 16, wherein the step of noting further comprises the steps of:

instructing the vendor to hold the electronic order in the holding file; or instructing the vendor to cancel the electronic order from the holding file.

18. The method of claim 17, further comprising the step of contacting the employee to give a status about the transaction.

19. The method of claim 15 or 18, further comprising the step of sending, by the pre-selected vendor, a reminder notice to the employer and employee if the employer does not respond to the step of transmitting the order summary within a predetermined time period.

20. The method of claim 19, further comprising the step of canceling the electronic order if the employer does not respond to the reminder notice within a specified period of time.

21. A system for selecting and processing payroll deduction as a payment option during electronic commerce between pre-selected vendors and an employee of an employer, the system comprising:

means for authorizing, by the employer, the pre-selected vendors to offer payroll deduction as a payment option during electronic commerce between the pre-selected vendors and the employee;

means for establishing, by the pre-selected vendors and the employer, guidelines for a payroll deduction plan;

means for storing the guidelines in the pre-selected vendors respective databases or in an external processing system database;

means for selecting after the step of establishing, by the employee, articles to be purchased from a web site of at least one of the pre-selected vendors, means for confirming on a confirmation page the selected articles, employer information, employee information and payroll deduction information and means for signing a financial responsibility agreement;

means for submitting, by the employee to the at least one pre-selected vendor or to the external processing system, at least one electronic order with the selected articles;

means for storing, by the at least one pre-selected vendor or the external processing system, the at least one electronic order in a holding file and means for contacting the employer to review an order summary of the at least one electronic order;

means for instructing the at least one pre-selected vendor, by the employer through the external processing system, to process the at least one electronic order; and means for dynamically processing, by the at least one pre-selected vendor or the external processing system, the at least one electronic order based on the guidelines.

22. The system of claim 21, wherein means for establishing guidelines further comprises:

means for establishing the number of pay periods during which deductions can occur and means for establishing the number of transactions allowed to each employee; and means for basing the number of payroll deductions on a total price of the electronic order.

23. The system of claim 22, wherein means for selecting articles to be purchased further comprises means for choosing payroll deduction as a payment option.

24. The system of claim 23, further comprising means for requesting the employee to enter a personal identifier, a secret password and an employer identifier upon choosing payroll deduction as a payment option.

25. The system of claim 24, further comprising means for using the secret password to confirm employee identity information during future electronic purchases.

26. The system of claim 25, further comprising means for obtaining the employer identifier by the employee from the employer or from the pre-selected vendor's web site.

27. The system of claim 26, further comprising means for ensuring accurate employer information by requesting the employee, who previously used payroll deduction as a payment option during a previous electronic commerce transaction on the pre-selected vendor's web site, to update the employer's information during a current electronic commerce transaction.

28. The system of claim 27, further comprising means for creating a unique holding file for each employer that authorizes payroll deduction as a payment option on the pre-selected vendor's web site.

29. The system of claim 28, wherein means for contacting the employer to review the order summary further comprises means for contacting the employer, a predefined number of times within a predetermined time period, when the order summary is pending in the employer's holding file.

30. The system of claim 29, wherein means for contacting the employer when the order summary is pending further comprises means for transmitting the order summary in an email with a link to a secure page from the pre-selected vendor's web site to a computer system of the employer.

31. The system of claim 29, wherein means for contacting the employer when the order summary is pending further comprises means for transmitting the order summary in a non-electronic mail from the pre-selected vendor's web site to the employer.

32. The system of claim 30 or 31, further comprising means for storing in the order summary, a date, a name and address of the employee, the employee's personal identifier, a total purchase price, and a number of required payroll deductions.

33. The system of claim 32, wherein means for reviewing further comprises means for approving or rejecting the order summary.

34. The system of claim 33, wherein means for processing the electronic order further comprises:

means for processing a transaction if the order summary is approved;

means for releasing the order summary from the holding file;

means for contacting the employee to give a status about the transaction; and means for delivering the selected articles to the employee.

35. The system of claim 34, further comprising means for deducting, by the employer, an appropriate amount from future earnings of the employee.

36. The system of claim 35, wherein means for reviewing further comprises means for noting a reason for rejecting the order summary or means for inviting the employee to contact the employer for the reason.

37. The system of claim 36, wherein means for noting further comprises:

means for instructing the vendor to hold the electronic order in the holding file; or means for instructing the vendor to cancel the electronic order from the holding file.

38. The system of claim 37, further comprising means for contacting the employee to give a status about the transaction.

39. The system of claim 35 or 38, further comprising means for sending, by the pre-selected vendor, a reminder notice to the employer and employee if the employer does not respond the order summary within a predetermined time period.

40. The system of claim 39, further comprising means for canceling the electronic order if the employer does not respond to the reminder notice within a specified period of time.

41. The system of claim 40, further comprising means for contacting the employee to give a status about the transaction.

42. The system of claim 21, wherein means for establishing guidelines further comprises means for establishing several sets of guidelines, whereby each set is associated with employees within a specific status and guidelines associated with each employee may change as the employee's status changes.

43. The system of claim 21, wherein the employee may view all guidelines or only those that apply to the employee.

44. The system of claim 25, further comprising means of connecting the vendor's web site with at least one external processing system where the employee's personal identifier and employment status may be confirmed.

45. The system of claim 23, wherein means for selecting articles to be purchased further comprises means for selecting articles to be purchased from the vendor's web sites or from other associated online merchant's web sites.

46. A method for selecting and processing payroll deduction as a payment option during electronic commerce between pre-selected vendors and an employee of an employer, the method comprising the steps of:

authorizing, by the employer, the pre-selected vendors to offer payroll deduction as a payment option during electronic commerce between the pre-selected vendors and the employee;

establishing, by the pre-selected vendors and the employer, guidelines for a payroll deduction plan;

storing the guidelines in the pre-selected vendors respective databases or in an external processing system database;

selecting, by the employee, articles to be purchased from a web site of at least one of the pre-selected vendors, confirming on a confirmation page the selected articles, employer information, employee information and payroll deduction information and accepting a financial responsibility agreement;

storing, by the at least one pre-selected vendor or the external processing system, at least one electronic order in the database; and dynamically processing, by the at least one pre-selected vendor or the external processing system, the at least one electronic order based on the guidelines.

47. The method of claim 46, wherein the step of establishing guidelines further comprises the steps of:

establishing a number of pay periods during which payroll deductions can occur;

establishing a number of transactions allowed to each employee; and basing a number of payroll deductions on a total price of the electronic order.

48. The method of claim 46, wherein the step of establishing guidelines further comprises the step of establishing several sets of guidelines, whereby each set is associated with employees within a specific status and said guidelines associated with each employee may change as the employee's status changes.

49. The method of claim 48, wherein the step of selecting articles to be purchased further comprises the step of choosing payroll deduction as a payment option.

50. The method of claim 49, further comprising the step of requesting the employee to enter a personal identifier, a secret password and an employer identifier upon the step of choosing payroll deduction as a payment option.

51. The method of claim 50, further comprising the step of using the secret password to confirm employee identity information for future electronic purchases.

52. The method of claim 51, further comprising the step of obtaining the employer identifier by the employee from the employer or from the pre-selected vendor's web site.

53. The method of claim 52, further comprising the step of ensuring accurate employer information by requesting the employee, who previously used payroll deduction as a payment option during a previous electronic commerce transaction on the pre-selected vendor's web site, to update the employer's information during a current electronic commerce transaction.

54. The method of claim 53, further comprising the step of using, by the vendor, previously established guidelines to act as an employer's agent in order to process online payroll deductions.

55. The method of claim 46, wherein the step of processing the electronic order further comprises the steps of:

connecting with external processing systems to approve the employees' online payroll deduction purchases without interaction from the employer;

contacting the employee to give a status about the purchases; and delivering the selected articles to the employee.

56. The method of claim 55, further comprising the step of deducting, by the employer, an appropriate amount from future earning of the employee.

57. A method for allowing an employee of an employer to place an order with one of a plurality of vendors, comprising:

(a) establishing guidelines for a payroll deduction plan with the employer, wherein the payroll deduction plan allows qualified employees of the employer to automatically pay for orders placed with any of the plurality of vendors using payroll deduction, and the payroll deduction plan establishes a number of pay periods during which payroll deductions will occur for each order placed by a qualified employee;

(b) periodically electronically receiving at an external processing system, from the employer, qualification information for employees of the employer who are qualified to participate in the payroll deduction plan;

(c) receiving electronically, at the external processing system, order information from one of the plurality of vendors with whom a purchasing employee wishes to place an order;

(d) determining electronically by the external processing system, in response to the order information and in accordance with the payroll deduction plan guidelines and the qualification information, whether to automatically approve or reject the order; and (e) if the order is approved, dynamically processing by the external processing system and causing the employer to automatically deduct payments for the order from the pay of the purchasing employee in accordance with the payroll deduction plan guidelines.

* * * * *